United States Patent Office 3,311,501
Patented Mar. 28, 1967

3,311,501
SILVER-CADMIUM SECONDARY BATTERY
Paul Ruetschi, Yardley, Pa., assignor to The Electric Storage Battery Company, a corporation of New Jersey
No Drawing. Filed May 25, 1964, Ser. No. 370,110
2 Claims. (Cl. 136—24)

This invention relates to a silver-cadmium secondary battery and in particular, it relates to novel additives which may be incorporated into either the alkaline electrolyte or the silver electrodes to improve the rechargeability and the conductivity of the silver oxide positive active material. When used in a silver-cadmium secondary battery in accordance with this invention, these novel additives will remain permanently active in the battery, since they cannot be removed by plating out on the negative cadmium electrodes.

It is well known in the secondary or rechargeable battery art that silver electrodes in alkaline electrolytes have a relatively poor charge acceptance, and that the charge acceptance becomes progressively poorer upon repeated cycling of the silver electrodes. For example, if a silver electrode is charged at a 20 hour rate, the electrode might accept a charge, i.e. an oxidation state, equivalent only to about 60 to 80% of the theoretical amount. During the charging operation, the silver electrodes reach an oxidation state whereby they evolve oxygen gas in preference to accepting further charge.

Batteries having silver oxide positive electrodes gradually lose capacity during cycling as a result of increasingly poor charge acceptance. This is particularly troublesome if the batteries are not overcharged excessively during each charging operation. Because of this decreasing charge acceptance, there is a reduced charge input during each subsequent charging operation. As a result, the poor charge acceptance of silver electrodes causes a decrease of the capacity during repeated cycling.

It is an object of this invention to provide a silver-cadmium secondary battery in which the silver positive electrodes have improved charge acceptance.

Another object of the invention is to provide novel additives for use in silver-cadmium batteries which improve the charge acceptance of the silver positive electrodes and which additives are not prevented from functioning by plating on the negative cadmium electrode during the cycling of the battery.

It is also well known in the electric storage battery art that during the charging of silver positive electrodes, the silver is first transformed into its monovalent oxide ($Ag_2O$). Each silver particle becomes coated with monovalent silver oxide. Since $Ag_2O$ is a very poor conductor of electricity, the coating of the electrode particles by this material causes the electrical resistance of the electrode to increase. This characteristic produces a high cell impedance which limits the application of cells utilizing silver positive electrodes.

Accordingly, it is a further object of the invention to provide a silver-cadmium battery having silver positive electrodes of improved electrical conductivity.

Other objects and purposes of this invention will be apparent to those skilled in the art in view of the following description.

It has been discovered that the addition of a metal selected from the group consisting of tin and germanium to either the alkaline electroylte or the silver positive electrode substantially improves the charge acceptance and electrical conductivity of the silver positive electrodes. In particular, it has been found that if the tin or germanium are added to the alkaline electrolyte or silver positive electrode in a silver-cadmium system, the metallic additives will not plate out on the cadmium negative electrode during the cycling of the battery and thus will not be prevented from functioning in the silver positive electrodes. As a result of the non-plating on the cadmium negative electrode, the tin and germanium constitute permanently active additives to the silver-cadmium system.

The metallic additives of this invention will continue to function during the complete cycle life of the silver-cadmium secondary battery. It is believed that the tin and germanium, which are soluble in the alkaline electrolyte, form stannate and germanate ions which react with the silver electrode upon charging of the electrode to form a conductive silver compound within the electrode, such as silver stannate or silver germanate. During the charging of the silver positive electrode, the conductive silver compound is formed simultaneously with the formation of the electrically non-conductive $Ag_2O$ in the electrode, and hence the resistance of the electrode is lowered.

Upon discharge of the silver positive electrode, the stannate and/or germanate ions are solubilized into the alkaline electrolyte solution, and upon each recharge, the silver stannate and/or germanate conductive matrix is again formed in the silver electrode.

Any source of the stannate or germanate ions may be used as long as it is soluble in the alkaline electrolyte and does not adversely affect the performance of the battery. It is generally preferred to incorporate the additive in the electrolyte, but if added to the silver electrodes, the additives will dissolve in the electrolyte upon discharge. If stannate or germanate compounds are added, metallic cations which will plate out on the electrodes should be avoided. Examples of suitable additives are tin, germanium, potassium stannate, potassium germanate, sodium stannate, sodium germanate, stannous and stannic oxides, and germanium oxides. The concentration of the tin and/or germanium in the silver electrode or electrolyte is not particularly critical. However, a concentration range providing from about 1 to about 50 grams of tin and/or germanium per kilogram of silver in the positive electrodes is generally preferred.

As previously indicated, the addition of tin or germanium to alkaline electrolytes or silver electrodes in accordance with this invention is limited to silver-cadmium batteries, for the tin and germanium do not plate out on the cadmium negative electrodes. In contrast thereto, in the silver-zinc system some tin and/or germanium is plated out on the negative zinc electrode during each cycle. Finally, after several cycles, there will be no stannate or germanate ions left in the electrolyte to perform the useful function at the positive silver electrode.

The following examples illustrate the improvement in the charge acceptance of silver electrodes containing stannate and germanate ions in accordance with this invention.

*Example I*

The charge acceptance of silver electrodes was tested in a conventional 20% potassium hydroxide solution electrolyte containing sodium stannate and was compared to the charge acceptance in the same electrolyte containing no sodium stannate. The silver electrodes were prepared by sintering silver powder at 550° C. for 22.5 minutes. The electrodes contained 4 grams of silver. The electrodes were charged in 100 cc. of electrolyte at 25° C., and one electrolyte solution contained 0.2 gram of sodium stannate. The electrodes were charged at a 20 hour formation rate using a charging current of 99 milliamperes. The electrode which was charged in this conventional electrolyte started gassing oxygen after 16 hours charging, indicating an 80% charge acceptance. The electrode which was charged in the electrolyte containing the sodium stannate did not start gassing oxygen until after about 17.25 hours which represents an 86% charge acceptance. This clearly demonstrates improved charge acceptance for silver electrodes in an electrolyte containing stannate ions.

*Example II*

The conductivity of silver oxide charged positive active material was also tested. Active material corresponding to a charged silver oxide electrode containing no additive was compared to silver oxide containing stannate ions and germanate ions. The silver oxide active material, both with and without an additive, was in the form of powder which was shaped into disks and compressed so as to simulate an electrode. The conductivity was determined by measuring the electrical resistivity of the compressed powders which were under a compression of 30,700 p.s.i. during the test. The stannate and germanate additives were present in an amount sufficient to provide 0.1% by weight of tin and germanium based on the amount of silver present. The results were as follows:

| Additive: | Electrical resistivity (ohm-cm.) |
| --- | --- |
| None | 60 |
| Stannate | 10.7 |
| Germanate | 38.2 |

The improvement in conductivity by adding the stannate and germanate is clearly demonstrated by this data.

Having completely described this invention, what is claimed is:

1. A silver-cadmium battery having an alkaline electrolyte containing germanate ions in the vicinity of the silver positive electrode after discharge of said battery, said germanate ions being present in amounts sufficient to provide from about 1 to about 50 grams of germanium per kilogram of silver in the positive electrode.

2. In a silver-cadmium battery having an alkaline electrolyte, the improvement in combination therewith comprising a silver positive electrode containing silver germanate in an amount sufficient to provide from about 1 to about 50 grams of germanium per kilogram of silver in the positive electrode.

References Cited by the Examiner

UNITED STATES PATENTS

| 2,715,151 | 8/1955 | Gritman et al. | 136—34 X |
| 2,942,052 | 6/1960 | Bourke et al. | 136—20 X |

FOREIGN PATENTS 143,327  5/1920  Great Britain.

WINSTON A. DOUGLAS, *Primary Examiner.*

B. J. OHLENDORF, A. SKAPARS, *Assistant Examiners.*